United States Patent
Kim et al.

(10) Patent No.: US 11,608,107 B2
(45) Date of Patent: Mar. 21, 2023

(54) MOTOR DRIVEN POWER STEERING SYSTEM AND CONTROL METHOD THEREOF

(71) Applicants: HYUNDAI MOTOR COMPANY, Seoul (KR); KIA MOTORS CORPORATION, Seoul (KR); IUCF-HYU (Industry-University Cooperation Foundation Hanyang University), Seoul (KR)

(72) Inventors: Kyu Won Kim, Seoul (KR); Chung Choo Chung, Seoul (KR); Yong Woo Jeong, Seoul (KR); Seung Hi Lee, Seongnam-si (KR)

(73) Assignees: HYUNDAI MOTOR COMPANY, Seoul (KR); KIA MOTORS CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 512 days.

(21) Appl. No.: 16/805,207

(22) Filed: Feb. 28, 2020

(65) Prior Publication Data
US 2021/0122412 A1 Apr. 29, 2021

(30) Foreign Application Priority Data
Oct. 28, 2019 (KR) .................. 10-2019-0134889

(51) Int. Cl.
*B62D 6/00* (2006.01)
*B62D 5/04* (2006.01)
*F16H 1/16* (2006.01)

(52) U.S. Cl.
CPC ......... *B62D 5/0463* (2013.01); *B62D 5/0409* (2013.01); *B62D 5/0481* (2013.01); *F16H 1/16* (2013.01)

(58) Field of Classification Search
CPC .. B62D 5/0463; B62D 5/0409; B62D 5/0481; B62D 6/10; B62D 6/00; F16H 1/16
(Continued)

(56) References Cited

U.S. PATENT DOCUMENTS 9,776,656 B2 * 10/2017 Wilhelm ............... B62D 5/0463
10,962,429 B2 * 3/2021 Hwang .................. B62D 5/006
(Continued)

FOREIGN PATENT DOCUMENTS

EP 3072782 A1 9/2016
KR 20170019669 A 2/2017

*Primary Examiner* — Shardul D Patel
(74) *Attorney, Agent, or Firm* — Lempia Summerfield Katz LLC

(57) ABSTRACT

A motor driven power steering system includes: a power source for generating a steering assistance force assisting the steering of a vehicle; a transfer gear positioned between a power source and a column for transferring the steering assistance force generated by the power source to the column; a parameter estimation unit for estimating a friction parameter of a dynamic friction model based on the actual friction torque actually generated in the transfer gear; and a state estimation unit for calculating a state variable of the dynamic friction model based on a contact surface moving speed of the transfer gear and for estimating expected friction torque according to the dynamic friction model by using the calculated state variable and the friction parameter of the dynamic friction model estimated by the parameter estimation unit.

13 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 10,974,761 | B2* | 4/2021 | Han | B62D 5/0463 |
| 11,305,813 | B2* | 4/2022 | Kim | B62D 5/0463 |
| 11,338,850 | B2* | 5/2022 | Sung | B62D 6/10 |
| 2010/0125391 | A1* | 5/2010 | Yang | B60T 8/1755 |
| | | | | 701/41 |
| 2014/0136056 | A1* | 5/2014 | Ono | B62D 6/006 |
| | | | | 701/42 |
| 2016/0280255 | A1* | 9/2016 | Wilhelm | B62D 5/0409 |
| 2017/0203785 | A1* | 7/2017 | Naik | B62D 5/0481 |
| 2019/0002022 | A1* | 1/2019 | Kim | B62D 5/0466 |
| 2019/0126981 | A1* | 5/2019 | Goering | G05D 1/021 |
| 2019/0389509 | A1* | 12/2019 | Kim | B62D 5/0484 |
| 2020/0180680 | A1* | 6/2020 | Han | B62D 6/008 |
| 2020/0283058 | A1* | 9/2020 | Okano | B62D 6/002 |
| 2020/0361530 | A1* | 11/2020 | Polmans | B62D 6/10 |
| 2020/0370979 | A1* | 11/2020 | Guilemond | B62D 5/0481 |
| 2020/0398888 | A1* | 12/2020 | Cho | G01L 3/04 |
| 2021/0039710 | A1* | 2/2021 | Cho | B62D 5/0463 |
| 2021/0122412 | A1* | 4/2021 | Kim | B62D 5/0409 |

* cited by examiner

MOTOR DRIVEN POWER STEERING SYSTEM AND CONTROL METHOD THEREOF

CROSS REFERENCE TO RELATED APPLICATION

The present application claims priority to Korean Patent Application No. 10-2019-0134889 filed on Oct. 28, 2019, the entire contents of which are incorporated herein for all purposes by this reference.

BACKGROUND OF THE DISCLOSURE

Field of the Disclosure

The present disclosure relates to a motor driven power steering system and a control method thereof, and more particularly, to a technology of estimating friction torque generated in a mechanism part of a motor driven power steering system for assisting the steering of a vehicle.

Description of the Related Art

Motor Driven Power Steering (MDPS) (or Electric Power Steering (EPS)) is a system for assisting steering power through an electronic control by replacing existing hydraulic power steering with an electric motor. The MDPS is a power steering system of a vehicle that eliminates the use of hydraulic parts such as an oil tank, a pump, and a hose. Instead, the MDPS uses a motor and a control device to assist the driver to steer the vehicle.

In other words, the motor driven power steering system directly connects the electric motor to the steering system to assist the driver's steering power. In particular, in the column type motor driven power steering system, the column connected to the driver's handle is connected with a rack gear through a worm gear.

However, according to the related art, the nonlinear friction component of the motor driven power steering system has been largely generated in the worm gear. The nonlinear friction component has characteristics in which the friction torque generated in the worm gear is changed by the steering angular speed of the column operated by the driver.

Further, a technology of estimating the friction torque through a dynamic model and compensating for the expected friction torque to control the steering has been required since the friction torque generated in the worm gear is affected by the assembling tolerance generated in the assembling process and the degree of wear of the gear.

The foregoing background is intended merely to aid in the understanding of the background of the present disclosure, and is not intended to mean that the present disclosure falls within the purview of the related art that is already known to those of ordinary skill in the art.

SUMMARY OF THE DISCLOSURE

The present disclosure is intended to solve the above problem. An object of the present disclosure is to provide a motor driven power steering system and a control method thereof, which estimate the friction torque generated in a worm gear for connecting between a column and a rack gear and controlling to compensate for it.

A motor driven power steering system according to the present disclosure includes: a power source for generating a steering assistance force assisting the steering of a vehicle; a transfer gear positioned between the power source and a column for transferring the steering assistance force generated by the power source to the column; a parameter estimation unit for estimating a friction parameter of a dynamic friction model based on the actual friction torque actually generated in the transfer gear; and a state estimation unit for calculating a state variable of the dynamic friction model based on a contact surface moving speed of the transfer gear, and for estimating expected friction torque. The expected friction torque is estimated according to the dynamic friction model by using the calculated state variable and the friction parameter of the dynamic friction model estimated by the parameter estimation unit.

The parameter estimation unit may estimate the friction parameter of the dynamic friction model by using the contact surface moving speed of the transfer gear, the state variable of the state estimation unit, and the actual friction torque.

The state estimation unit may calculate the state variable of the dynamic friction model by using a previously stored friction torque map according to the contact surface moving speed of the transfer gear.

The dynamic friction model may be a LuGre friction model comprising static friction, kinetic friction, and viscous friction. The friction parameter may include a stiffness friction parameter, a damping friction parameter, and a viscous friction parameter.

The motor driven power steering system may further include: a control torque calculator for calculating a control torque of the power source based on a required steering angle and a required steering angular speed; and a power source controller for controlling the power source by reflecting the expected friction torque estimated by the state estimation unit to the control torque of the power source calculated by the control torque calculator.

The motor driven power steering system may further include a disturbance compensator for calculating a difference between the actual friction torque and the expected friction torque estimated by the state estimation unit, and for compensating the calculated difference for the control torque.

A method for controlling a motor driven power steering system according to the present disclosure for achieving the object includes: estimating a friction parameter of a dynamic friction model based on the actual friction torque actually generated in a transfer gear; calculating a state variable of the dynamic friction model based on a contact surface moving speed of the transfer gear; and estimating an expected friction torque according to the dynamic friction model by using the calculated state variable of the dynamic friction model and the estimated friction parameter of the dynamic friction model.

The estimating of the friction parameter of the dynamic friction model may estimate the friction parameter of the dynamic friction model by using the contact surface moving speed of the transfer gear, the state variable of the dynamic friction model, and the actual friction torque.

The estimating of the friction parameter of the dynamic friction model may estimate a friction parameter that minimizes an error between the actual friction torque and the expected friction torque.

The calculating of the state variable of the dynamic friction model may calculate the state variable of the dynamic friction model by using a previously stored friction torque map according to a contact surface moving speed of the transfer gear.

The dynamic friction model may be a LuGre friction model including static friction, kinetic friction, and viscous friction. The friction parameter may include a stiffness friction parameter, a damping friction parameter, and a viscous friction parameter.

The control method of the motor driven power steering system may further include: calculating the control torque of a power source based on a required steering angle or a required steering angular speed, after the estimating of the expected friction torque; and controlling the power source by reflecting the expected friction torque estimated by a state estimation unit to the calculated control torque of the power source.

The control method of the motor driven power steering system may further include compensating a difference between the actual friction torque and the expected friction torque estimated by the state estimation unit for the control torque, before the controlling of the power source.

According to the motor driven power steering system and the control method thereof of the present disclosure, it is possible to cyclically update the friction parameter of the dynamic friction model to be adapted to the change of the friction parameter generated by the assembling tolerance, the wear of the mechanism unit, or the like to update the dynamic friction model, thereby enabling the robust steering control.

BRIEF DESCRIPTION OF THE DRAWINGS

The above and other objects, features and other advantages of the present disclosure should be more clearly understood from the following detailed description when taken in conjunction with the accompanying drawings, in which.

DETAILED DESCRIPTION OF THE DISCLOSURE

Figure 1:
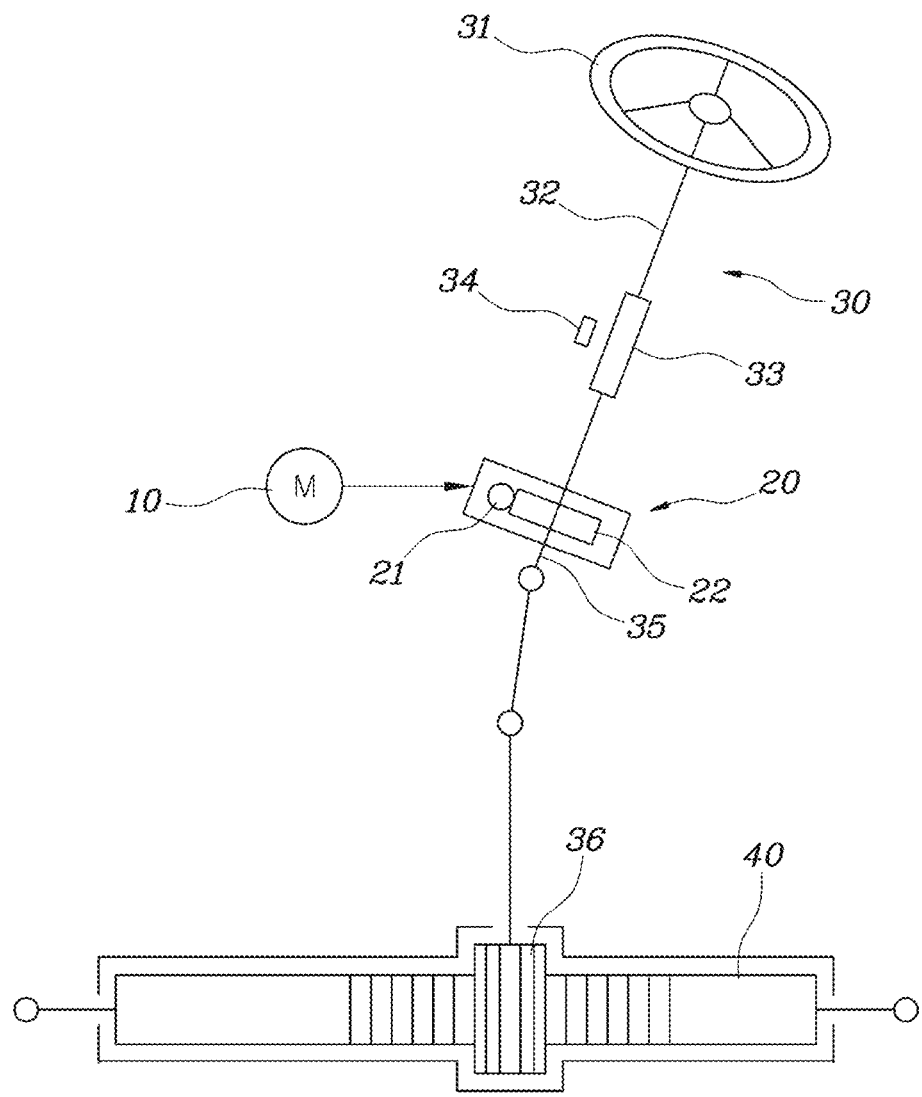
FIG. 1 is a diagram illustrating a configuration of a motor driven power steering system according to an embodiment of the present disclosure.

Specific structural and functional descriptions of the embodiments of the present disclosure disclosed in the specification or application are only for the purpose of illustrating the embodiments of the present disclosure. The embodiments in accordance with the present disclosure may be embodied in various forms and should not be construed as limited to the embodiments set forth in the specification or application.

Various modifications and various forms may be made in the embodiments according to the present disclosure, so that specific embodiments are illustrated in the drawings and described in detail in the specification or application. It should be understood, however, that it is not intended to limit the embodiments in accordance with the concepts of the present disclosure to the particular disclosed forms. However, the disclosure includes all modifications, equivalents, and alternatives falling within the spirit and technical scope of the present disclosure.

The terms "first" and/or "second," and the like may be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure.

It should be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

The terminology used in the specification is for the purpose of describing particular embodiments only and is not intended to limit the present disclosure. The singular forms are intended to include the plural forms as well, unless the context clearly indicates otherwise. In the specification, it should be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Unless otherwise defined, all terms including technical and scientific terms used herein have the same meaning as commonly understood by one of ordinary skill in the art to which the present disclosure belongs. It should be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, the present disclosure is described in detail by describing various embodiments of the present disclosure with reference to the accompanying drawings. The same reference numerals indicated in each drawing denote the same members.

Figure 2:
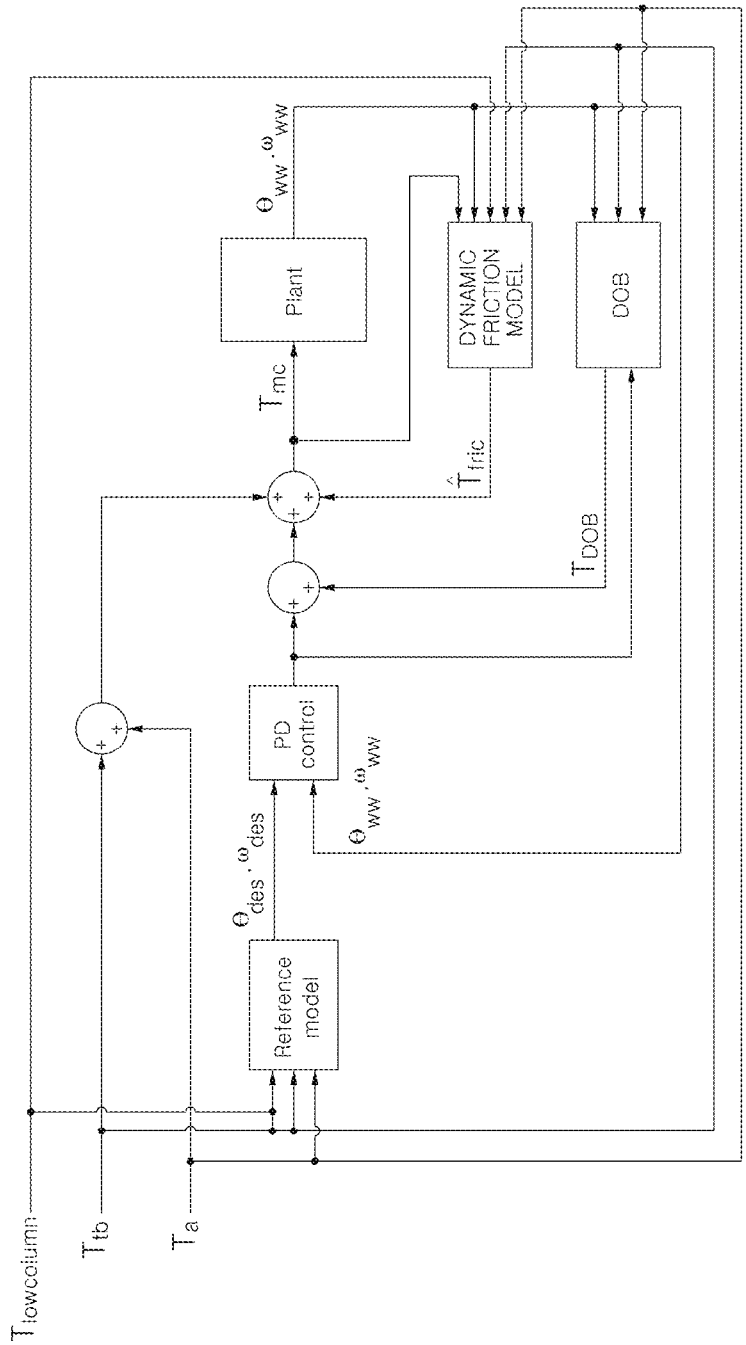
FIG. 2 is a control diagram illustrating a control method of the motor driven power steering system according to an embodiment of the present disclosure.
Figure 3:
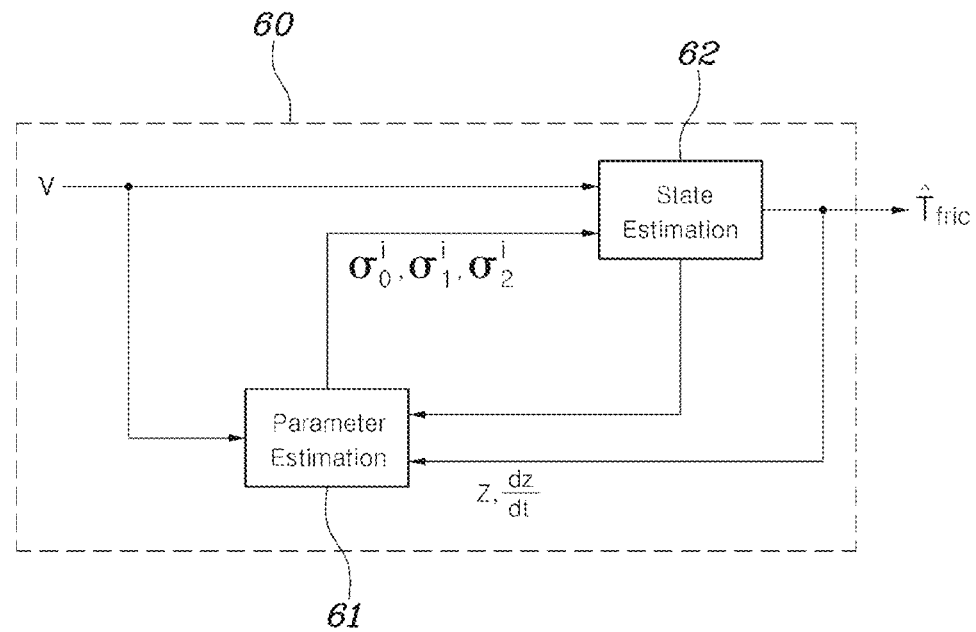
FIG. 3 is a diagram illustrating a configuration of a dynamic friction model according to an embodiment of the present disclosure.

FIG. 1 is a diagram illustrating a configuration of a motor driven power steering system according to an embodiment of the present disclosure. FIG. 2 is a control diagram illustrating a control method of the motor driven power steering system according to an embodiment of the present disclosure. FIG. 3 is a diagram illustrating a configuration of a dynamic friction model 60 according to an embodiment of the present disclosure.

Referring to FIGS. 1-3, the motor driven power steering system according to an embodiment of the present disclosure includes: a power source 10 for generating a steering assistance force assisting the steering of a vehicle; a transfer gear 20 positioned between the power source 10 and a column 30 for transferring the steering assistance force generated by the power source 10 to the column 30; a parameter estimation unit 61 for estimating a friction parameter of the dynamic friction model 60 based on the actual friction torque actually generated by the transfer gear 20; and a state estimation unit 62 for calculating a state variable of the dynamic friction model 60 based on a contact surface moving speed of the transfer gear 20, and for estimating expected friction torque according to the dynamic friction model 60 by using the calculated state variable and the friction parameter of the dynamic friction model 60 estimated by the parameter estimation unit 61.

The motor driven power steering (MDPS) system according to an embodiment of the present disclosure is a Rack-Motor Driven Power Steering (R-MDPS) system using a rack gear 40. The R-MDPS system may be a structure in which the column 30 is disposed between a steering wheel 31 and the rack gear 40. A pinion gear 36 formed in the column 30 is connected with the rack gear 40. More specifically, the column 30 connected with the steering wheel 31 is connected to the rack gear 40 through the pinion gear 36. The torsional displacement of the column 30 may be generated by the rotation of the steering wheel 31.

The column 30 may include a steering shaft 32, a torsion bar 33, and an assist shaft 35, which are directly connected with the steering wheel 31, and they may be coaxially connected to be rotated in the same rotation direction. The assist shaft 35 may be coupled to a pinion gear 36 for transferring power to the rack gear 40 having a tie rod (not illustrated), which is connected with a steering wheel (not illustrated), coupled to both end portions thereof.

A torque sensor 34 is disposed around the steering shaft 32 or the torsion bar 33. The torque sensor 34 may sense the torsion of the torsion bar 33 generated by the driver operating the steering wheel 31 or the torque ($T_{tb}$) of the torsion bar 33.

In an embodiment, the power source 10 may be a motor 10. The power source 10 may be connected to the column 30 (in particular, the assist shaft 35) to provide the steering assistance force.

In this embodiment, the power source 10 in the present disclosure is described with respect to a column mount MDPS method (C-MDPS) that is connected to the column 30 to provide the steering assistance force. However, the power source 10 may be applied to the rack mount method (R-MDPS) in the same manner.

The transfer gear 20 is a kind of a speed reducer. The transfer gear may transfer the steering assistance force generated by the power source 10 to the assist shaft 35. In an embodiment, the transfer gear 20 may include a worm gear 21 and a worm wheel 22. The worm gear 21 may be coupled to the power source 10, and the worm wheel 22 may be connected to the assist shaft 35.

The worm gear 21 and the worm wheel 22 are coupled to each other to transfer the steering assistance force generated by the power source 10, and the friction torque is structurally generated therebetween. The dynamic friction model 60 for estimating such friction torque may be set.

Referring to the dynamic friction model 60, a friction model such as a Darl model may also be used. However, in the present disclosure, the friction torque is estimated by using the friction model according to a LuGre model.

The parameter estimation unit 61 may estimate the friction parameter of the dynamic friction model 60 based on the actual friction torque actually generated by the transfer gear 20.

In an embodiment, the parameter estimation unit 61 may estimate the friction parameter of the dynamic friction model 60 by the least square method by using the actual friction torque, the contact surface moving speed, and the state variable of the dynamic friction model 60 during a predetermined time.

Specifically, the parameter estimation unit 61 is configured to update the friction parameter used in the dynamic friction model 60 in order to estimate the expected friction torque. The parameter estimation unit 61 controls the power source 10 by estimating the expected friction torque, and then newly estimates the friction parameter of the dynamic friction model 60 by using the actual friction torque of the transfer gear 20 according to the driving of the power source 10 actually controlled by reflecting the expected friction torque.

Further, the state estimation unit 62 is configured to calculate a state variable of the dynamic friction model 60 and estimate the expected friction torque by inputting the calculated state variable to the dynamic friction model 60. In particular, the friction parameter of the dynamic friction model 60 may be previously stored or previously estimated by the parameter estimation unit 61.

In an embodiment, the state estimation unit 62 may calculate the state variable of the dynamic friction model 60 during a predetermined time by using the friction parameter of the dynamic friction model 60 estimated by the parameter estimation unit 61, and therefore, estimate the expected friction torque, and thereafter, use the updated friction parameter of the dynamic friction model 60.

In other words, it is possible to cyclically update the friction parameter of the dynamic friction model 60 in the parameter estimation unit 61 and the state estimation unit 62 to be adapted to a change in the friction parameter generated by the assembling tolerance, the wear of the mechanism unit, or the like to update the dynamic friction model 60. Thereby, a robust steering control may be enabled.

It is possible to repeat such control for each speed section to estimate the friction parameter adaptive to the change in the friction torque due to component distribution and durability deterioration.

The MDPS system may further include: a control torque calculator 70 for calculating a control torque of the power source 10 based on a required steering angle or a required steering angular speed; and a power source controller 80 for controlling the power source 10 by reflecting the expected friction torque estimated by the state estimation unit 62 to the control torque of the power source 10 calculated by the control torque calculator 70.

The control torque calculator 70 may calculate the control torque ($T_{mc}$) of the power source (Plant) 10 for generating the steering assistance force. The control torque calculator 70 may calculate the control torque ($T_{mc}$) of the power source 10 by reflecting the required steering angle, the required steering angular speed, the actual steering angle, and the actual steering angular speed.

In an embodiment, a reference model 50 may calculate the required steering angle ($\theta_{des}$) and the required steering angular speed ($\omega_{des}$) by using an assist torque command value ($T_a$) and an actual steering torque (a torsion bar torque ($T_{tb}$) and an assist shaft 35 torque ($T_{lowcolumn}$)).

The control torque calculator 70 may perform a feedback control so that the actual steering angle ($\theta_{ww}$) and the actual steering angular speed ($\omega_{ww}$) of the worm wheel 22 follow the required steering angle ($\theta_{des}$) and the required steering angular speed ($\omega_{des}$). For example, the power source 10 may be controlled by a Proportional-Derivative (PD) Control method.

The power source controller 80 is configured to control the power source 10 based on the control torque of the power source 10 calculated by the control torque calculator 70, and may control the power source 10 by reflecting the expected friction torque estimated by the state estimation unit 62. The expected friction torque is estimated according to the dynamic friction model 60 and may be estimated by the state estimation unit 62.

The present disclosure may further include a disturbance compensator (DOB: Disturbance Observer) 90 for calculating the difference between the actual friction torque and the expected friction torque estimated by the state estimation unit 62 and compensating the calculated difference for the control torque.

The disturbance compensator 90 may compensate a residual friction component ($T_{DOB}$) for the control torque. The residual friction component ($T_{DOB}$) is a difference between the actual friction torque and the expected friction torque In particular, the expected friction torque estimated by the state estimation unit 62 may be compensated for the control torque in a Feed-Forward method, thereby enhancing the following control performance. The residual friction component may be compensated by the disturbance compensator 90.

Referring to FIGS. 2 and 3, a method of controlling the motor driven power steering system according to an embodiment of the present disclosure includes: estimating the friction torque of the dynamic friction model 60 based on the actual friction parameter actually generated in the transfer gear 20; calculating the state variable of the dynamic friction model 60 based on the contact surface moving speed of the transfer gear 20; and estimating the expected friction torque according to the dynamic friction model 60 by using the calculated state variable of the dynamic friction model 60 and the estimated friction parameter of the dynamic friction model 60.

The estimating of the friction parameter of the dynamic friction model 60 may estimate the friction parameter of the dynamic friction model 60 based on the actual friction torque generated between the worm gear 21 and the worm wheel 22.

The actual friction torque may be estimated by using the assist torque command value ($T_a$) and the actual steering torque (the torsion bar torque ($T_{tb}$) and the assist shaft 35 torque ($T_{lowcolumn}$)).

Specifically, the estimating of the friction parameter of the dynamic friction model 60 may estimate the friction parameter of the dynamic friction model 60 by using the contact surface moving speed of the transfer gear 20, the state variable of the dynamic friction model 60, and the actual friction torque.

The contact surface moving speed (v) of the transfer gear 20 may be calculated from the rotational speed of the transfer gear 20. It may be calculated by using the rotational speed of the worm gear 21, which is connected with the power source 10 to rotate at the same time, and the circumferential length of the worm gear 21, or from the rotational speed of the worm wheel 22.

The dynamic friction model 60 is a LuGre friction model including static friction, kinetic friction, and viscous friction, and the friction parameter may include a stiffness friction parameter, a damping friction parameter, and a viscous friction parameter.

Specifically, the LuGre model is a Bristle type dynamic friction model 60. The state variable of the dynamic friction model 60 may include $$z = F_f / \sigma_\theta \text{ and } \frac{dz}{dt} = v - \sigma_0 \frac{|v|}{g(v)} z$$

as the state variable in the LuGre model.

In the LuGre model, the friction torque according to the contact surface speed may be estimated by the following formula.

$$T_{fric} = \sigma_0 z + \sigma_1(\theta, v)\frac{dz}{dt} + \sigma_2(\theta, v)v$$

Where $\sigma_0$ refers to the stiffness friction parameter, $\sigma_1(\theta,v)$ refers to the damping friction parameter, $\sigma_2(\theta,v)$ refers to the viscous friction parameter, z refers to the Bristle displacement [μm], and v refers to the contact surface speed.

The charging rate $$\left(\frac{dz}{dt}\right)$$

of the Bristle displacement among the state variables may be calculated by the following formula:

$$\frac{dz}{dt} = v - \sigma_0 \frac{|v|}{g(v)} z$$

where g(v) may be a friction torque map according to the contact surface moving speed. In an embodiment, the friction torque map according to the contact surface moving speed may be calculated by the following formula:

$$g(v) = T_c + (T_s - T_c)e^{-\left(\frac{v}{v_s}\right)^2}$$

where $T_c$ refers to a Coulomb friction torque, $T_s$ refers to a maximum static friction torque, and $v_s$ may be a predetermined value as the moving speed that provides a Stribeck effect.

Figure 4:
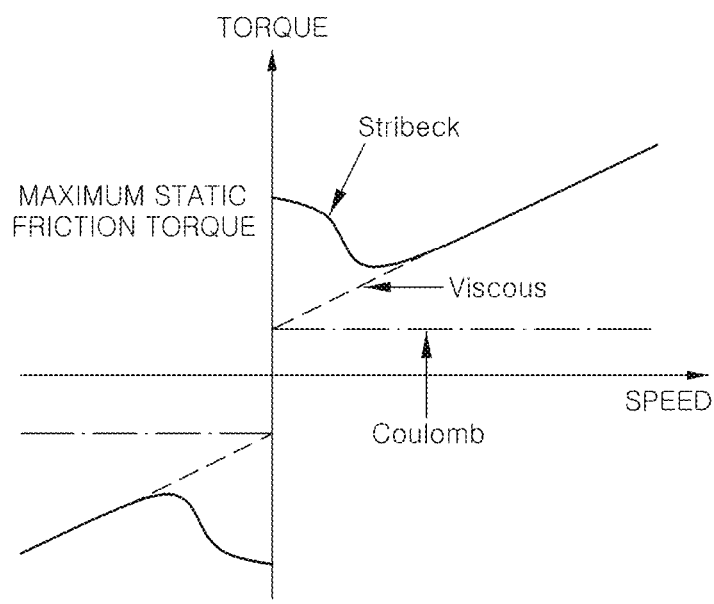
FIG. 4 is a diagram illustrating a friction torque map according to a contact surface moving speed according to an embodiment of the present disclosure.

FIG. 4 is a diagram illustrating a friction torque map according to the contact surface moving speed according to an embodiment of the present disclosure.

Further referring to FIG. 4, a friction torque map (g(v)) according to the contact surface moving speed may be determined considering the Stribeck effect, the viscous friction, and the Coulomb friction.

The calculating of the state variable of the dynamic friction model 60 may calculate the state variable of the dynamic friction model 60 by using the previously stored friction torque map according to the contact surface moving speed of the transfer gear 20.

In other words, the calculating of the state variable of the dynamic friction model 60 may calculate the state variable (the charging rate $\left(\frac{dz}{dt}\right)$ of the Bristle displacement) of the dynamic friction model 60 according to the contact surface moving speed by using the formula of the previously stored friction torque map (g(v)) according to the contact surface moving speed or the previously mapped friction torque map (g(v)) according to the contact surface moving speed.

The estimating of the friction parameter of the dynamic friction model 60 may estimate the friction parameter that minimizes the error between the actual friction torque and the expected friction torque.

The expected friction torque ($\hat{T}_{fric}$) may be estimated by the following formula:

$$\hat{T}_{fric} = \sigma_0 z + \sigma_1(\theta, v)\frac{dz}{dt} + \sigma_2(\theta, v)v$$
$$= \begin{bmatrix} z & \frac{dz}{dt} & v \end{bmatrix}\begin{bmatrix} \sigma_0 & \sigma_1 & \sigma_2 \end{bmatrix}^T$$
$$= X\sigma$$

Where X refers to the state variable of the dynamic friction model 60, and a refers to the friction parameter of the dynamic friction model 60.

If the error between the actual friction torque ($T_{fric}$) and the expected friction torque ($\hat{T}_{fric}$) is set to e, an objective function (J) composed of the square of the error may be defined as follows:

$$J = \frac{1}{2}ee^T$$
$$= \frac{1}{2}\hat{T}_{fric}^2 - T_{fric}^T \hat{T}_{fric} + \frac{1}{2}T_{fric}^2$$

In order to find the friction parameter that minimizes the objective function (J) composed of the square of the error, assuming that the partial derivative value of the objective function with σ is 0, the friction parameter that minimizes the error between the actual friction torque and the expected friction torque may be estimated as follows:

$$\frac{\partial}{\partial \sigma}J = -X^T T_{fric} + X^T X\sigma$$
$$\rightarrow \sigma_{opt} = (X^T X)^{-1} X^T T_{fric}$$

If the estimated friction parameter is applied to the friction torque map (g(v)) according to the contact surface moving speed, the state variable of the dynamic friction model 60 may be calculated, and the expected friction torque according to the state variable and the contact surface moving speed (v) may be estimated.

Therefore, it is possible to set the friction parameter of the dynamic friction model 60 so that the expected friction torque converges to the actual friction torque to constitute the dynamic friction model 60 as actual, thereby enhancing the steering feeling of the power steering system.

Figure 5:
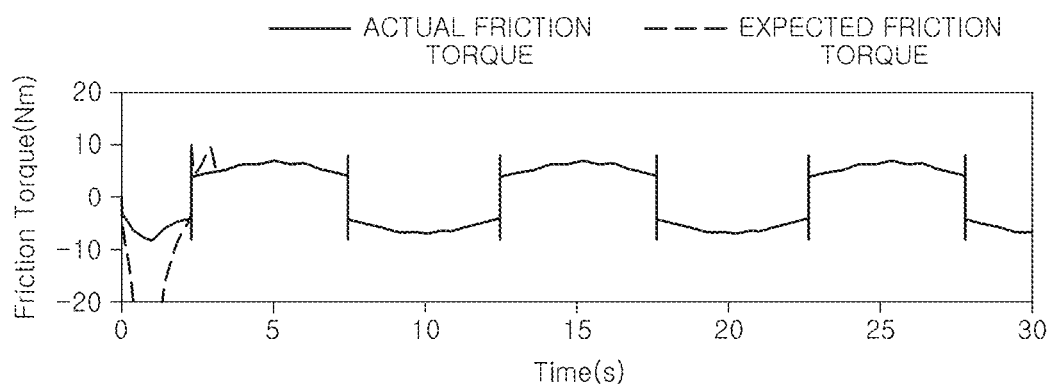
FIG. 5 is a diagram illustrating actual friction torque and expected friction torque applying the motor driven power steering system according to an embodiment of the present disclosure.
Figure 6:
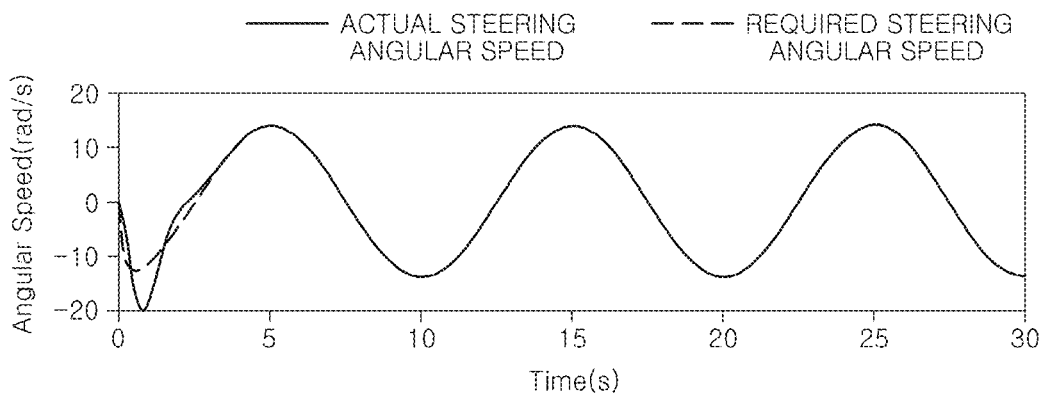
FIGS. 6 and 7 are graphs illustrating a steering angular speed and a steering angle for applying the motor driven power steering system according to an embodiment of the present disclosure.
Figure 7:
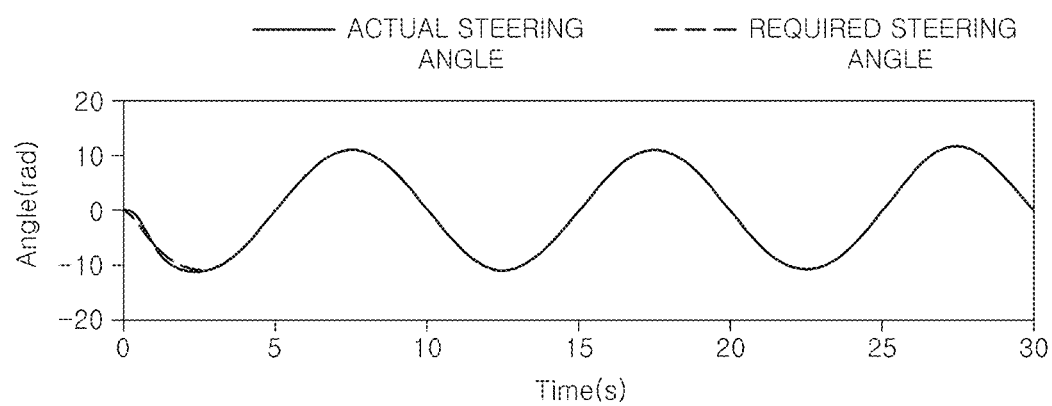

FIG. 5 illustrates the actual friction torque and the expected friction torque applying the motor driven power steering system according to an embodiment of the present disclosure. FIGS. 6 and 7 are graphs illustrating a steering angular speed and a steering angle applying the motor driven power steering system according to an embodiment of the present disclosure.

Further referring to FIG. 5, if the motor driven power steering system according to an embodiment of the present disclosure is applied, it may be confirmed that the expected friction torque estimated by using the dynamic friction model 60 is estimated to be almost equal to the actual friction torque.

Further, referring to FIGS. 6 and 7, it may be confirmed that the actual steering angular speed and the actual steering angle estimate the required steering angular speed and the required steering angle without the error.

In other words, according to the motor driven power steering system and the control method thereof according to an embodiment of the present disclosure, it has been proved that it is possible to accurately estimate the required steering angle and the required steering angular speed of the driver, thereby implementing the required steering feeling.

The parameter estimation unit, the state estimation unit, the control torque calculator, the power source controller and the disturbance compensator according to an embodiment of the present disclosure are parts of a controller (ex. ECU).

The controller according to an exemplary embodiment of the present disclosure may be implemented through a non-transitory memory (not shown) configured to store data with respect to algorithms configured to control operations of various components in the vehicle or software instructions reproducing the algorithms, and a processor (not shown) configured to perform the operations described hereinafter by using the data stored in the memory. Herein, the memory and the processor may be implemented as separate chips. Alternatively, the memory and the processor may be implemented as a single chip integrated with each other. The processor may take the form of one or more processor(s).

While it has been illustrated and described with respect to the specific embodiments of the present disclosure, it should be understood by those of ordinary skill in the art that various improvements and changes of the present disclosure may be made within the technical spirit of the present disclosure as provided by the following claims.

What is claimed is:

1. A motor driven power steering system, comprising:
    a power source for generating a steering assistance force assisting the steering of a vehicle;
    a transfer gear positioned between the power source and a column for transferring the steering assistance force generated by the power source to the column, the transfer gear including a worm gear coupled to the power source and a worm wheel connected to an assist shaft;
    a parameter estimation unit for estimating a friction parameter of a dynamic friction model based on the actual friction torque actually generated in the transfer gear; and
    a state estimation unit for calculating a state variable of the dynamic friction model based on a contact surface moving speed of the transfer gear which is calculated from a rotational speed of the transfer gear, and estimating expected friction torque according to the dynamic friction model by using the calculated state variable and the friction parameter of the dynamic friction model estimated by the parameter estimation unit.

2. The motor driven power steering system according to claim 1,
wherein the parameter estimation unit estimates the friction parameter of the dynamic friction model by using the contact surface moving speed of the transfer gear, the state variable of the state estimation unit, and the actual friction torque.

3. The motor driven power steering system according to claim 1,
wherein the state estimation unit calculates the state variable of the dynamic friction model by using a previously stored friction torque map according to the contact surface moving speed of the transfer gear.

4. The motor driven power steering system according to claim 1,
wherein the dynamic friction model is a LuGre friction model comprising static friction, kinetic friction, and viscous friction, and wherein the friction parameter comprises a stiffness friction parameter, a damping friction parameter, and a viscous friction parameter.

5. The motor driven power steering system according to claim 1, further comprising:
a control torque calculator for calculating a control torque of the power source based on a required steering angle and a required steering angular speed; and
a power source controller for controlling the power source by reflecting the expected friction torque estimated by the state estimation unit to the control torque of the power source calculated by the control torque calculator.

6. The motor driven power steering system according to claim 5, further comprising a disturbance compensator for calculating a difference between the actual friction torque and the expected friction torque estimated by the state estimation unit, and compensating the calculated difference for the control torque.

7. A control method for controlling a motor driven power steering system of claim 1, the control method comprising:
estimating a friction parameter of a dynamic friction model based on the actual friction torque actually generated in a transfer gear;
calculating a state variable of the dynamic friction model based on a contact surface moving speed of the transfer gear; and
estimating an expected friction torque according to the dynamic friction model by using the calculated state variable of the dynamic friction model and the estimated friction parameter of the dynamic friction model.

8. The control method according to claim 7,
wherein the estimating of the friction parameter of the dynamic friction model estimates the friction parameter of the dynamic friction model by using the contact surface moving speed of the transfer gear, the state variable of the dynamic friction model, and the actual friction torque.

9. The control method according to claim 8,
wherein the estimating of the friction parameter of the dynamic friction model estimates a friction parameter that minimizes an error between the actual friction torque and the expected friction torque.

10. The control method according to claim 7,
wherein the calculating of the state variable of the dynamic friction model calculates the state variable of the dynamic friction model by using a previously stored friction torque map according to a contact surface moving speed of the transfer gear.

11. The control method according to claim 7,
wherein the dynamic friction model is a LuGre friction model comprising static friction, kinetic friction, and viscous friction, and the friction parameter comprises a stiffness friction parameter, a damping friction parameter, and a viscous friction parameter.

12. The control method according to claim 7, further comprising:
calculating the control torque of a power source based on a required steering angle or a required steering angular speed, after the estimating of the expected friction torque; and
controlling the power source by reflecting the expected friction torque estimated by a state estimation unit to the calculated control torque of the power source.

13. The control method according to claim 12, further comprising compensating a difference between the actual friction torque and the expected friction torque estimated by the state estimation unit for the control torque, before the controlling of the power source.

* * * * *